US008661211B2

(12) United States Patent
Dow

(10) Patent No.: US 8,661,211 B2
(45) Date of Patent: *Feb. 25, 2014

(54) METHOD FOR MIGRATING CONTENTS OF A MEMORY ON A VIRTUAL MACHINE

(75) Inventor: Eli M. Dow, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/845,380

(22) Filed: Aug. 27, 2007

(65) Prior Publication Data

US 2009/0063751 A1   Mar. 5, 2009

(51) Int. Cl.
*G06F 12/16* (2006.01)
(52) U.S. Cl.
USPC ............................................. 711/162; 718/1
(58) Field of Classification Search
USPC ................. 711/6, 165, 154, 161–162; 718/1
See application file for complete search history.

(56) References Cited

U.S. PATENT DOCUMENTS

| | | | |
|---|---|---|---|
| 5,333,311 A | 7/1994 | Whipple, II | |
| 5,778,388 A | 7/1998 | Kawamura et al. | |
| 5,829,023 A | 10/1998 | Bishop | |
| 5,878,263 A * | 3/1999 | Fortin et al. ................... | 717/162 |
| 5,983,318 A | 11/1999 | Willson et al. | |
| 6,266,742 B1 | 7/2001 | Challenger et al. | |
| 6,453,408 B1 | 9/2002 | Fiske et al. | |
| 6,496,909 B1 | 12/2002 | Schimmel | |
| 6,804,729 B2 | 10/2004 | Swanberg | |
| 6,839,739 B2 | 1/2005 | Wilson | |
| 6,959,360 B2 | 10/2005 | Murotani et al. | |
| 7,111,145 B1 | 9/2006 | Chen et al. | |
| 7,124,272 B1 | 10/2006 | Kennedy et al. | |
| 7,257,811 B2 | 8/2007 | Hunt et al. | |
| 7,313,793 B2 | 12/2007 | Traut et al. | |
| 7,484,208 B1 * | 1/2009 | Nelson .............................. | 718/1 |
| 7,523,149 B1 | 4/2009 | Sridharan et al. | |

(Continued)

OTHER PUBLICATIONS

Filed contemporaneously with present application on Aug. 27, 2007. "Utilizing System Configuration Information to Determine a Data Migration Order". Eli M. Dow. Specification having 22 pgs. Figures having 6 sheets.
Filed contemporaneously with present application on Aug. 27, 2007. "Tracking Data Updates During Memory Migration". Eli M. Dow. Specification having 28 pgs. Figures having 6 sheets.

(Continued)

*Primary Examiner* — Aimee Li
*Assistant Examiner* — Nicholas Simonetti
(74) *Attorney, Agent, or Firm* — Cantor Colburn LLP; John Campbell

(57) ABSTRACT

A method for migrating contents of a memory on a virtual machine. The method includes computer instructions for establishing communication from a source virtual machine to a target virtual machine, the source virtual machine including a memory. The contents of the memory on the source virtual machine are transmitted to the target virtual machine. The contents of the memory on the source virtual machine include a plurality of pages. It is determined if all or a subset of the pages have been modified on the source virtual machine subsequent to being transmitted to the target virtual machine. If it is determined that all or a subset of the pages have been modified, then the modified pages, including a page location and page content for each of the modified pages, are transmitted to the target virtual machine. The determining and transmitting the modified pages continues until the number of remaining pages that have been modified is less than a threshold. The virtual machine is then paused the remaining pages are transmitted to the target virtual machine.

13 Claims, 6 Drawing Sheets

(56) References Cited

U.S. PATENT DOCUMENTS

| | | | |
|---|---|---|---|
| 7,577,722 | B1 | 8/2009 | Khandekar et al. |
| 2002/0133491 | A1 | 9/2002 | Sim et al. |
| 2004/0010787 | A1 | 1/2004 | Traut et al. |
| 2006/0026372 | A1 | 2/2006 | Kim et al. |
| 2006/0036830 | A1 | 2/2006 | Dinechin et al. |
| 2006/0129654 | A1 | 6/2006 | Sato |
| 2006/0179177 | A1 | 8/2006 | Arndt et al. |
| 2007/0011422 | A1 | 1/2007 | Srinivasan et al. |
| 2007/0016745 | A1 | 1/2007 | Dalton et al. |
| 2007/0050757 | A1 | 3/2007 | Van Woerkom et al. |
| 2007/0055820 | A1 | 3/2007 | Eguchi et al. |
| 2007/0067766 | A1 | 3/2007 | Tal et al. |
| 2007/0074217 | A1 | 3/2007 | Ravic et al. |
| 2007/0180450 | A1 | 8/2007 | Croft et al. |
| 2008/0059726 | A1 | 3/2008 | Rozas et al. |
| 2008/0244569 | A1 | 10/2008 | Challener et al. |
| 2009/0007106 | A1 | 1/2009 | Araujo, Jr. et al. |
| 2009/0222558 | A1 | 9/2009 | Xu et al. |
| 2010/0125845 | A1 | 5/2010 | Sugumar et al. |

OTHER PUBLICATIONS

Filed contemporaneously with present application on Aug. 27, 2007. "Migrating Contents of a Memory on a Virtual Machine". Eli M. Dow. Specification having 23 pgs. Figures having 6 sheets.

Filed contemporaneously with present application on Aug. 27, 2007. "Utilizing Data Access Patterns to Determine a Data Migration Order". Eli M. Dow. Specification having 22 pgs. Figures having 6 sheets.

Filed contemporaneously with present application on Aug. 27, 2007. "Method for Utilizing Data Access Patterns to Determine a Data Migration Order". Eli M. Dow. Specification having 20 pgs. Figures having 6 sheets.

Clark, C. et al.; Live Migration of Virtual Machines:; 2005; 14 pages.

U.S. Appl. No. 11/845,354 Non-Final Office Action dated May 23, 2011.

Non-Final Office Action dated May 23, 2011 for U.S. Appl. No. 11/845,354 entitled "Utilizing System Configuration Information to Determine a Data Migration Order", pp. 1-27.

* cited by examiner ent to being transmitted to the target virtual machine. If it is determined that all or a subset of the pages have been modified, then the modified pages, including a page location and page content for each of the modified pages, are transmitted to the target virtual machine. The determining and transmitting the modified pages continues until the number of remaining pages that have been modified is less than a threshold. The virtual machine is then paused the remaining pages are transmitted to the target virtual machine.

METHOD FOR MIGRATING CONTENTS OF A MEMORY ON A VIRTUAL MACHINE

CROSS REFERENCE TO RELATED APPLICATIONS

The present application is co-pending with the concurrently filed application U.S. Pat. Ser. No. 11/845,371, entitled "MIGRATING CONTENTS OF A MEMORY ON A VIRTUAL MACHINE", filed contemporaneously herewith and hereby incorporated by reference in its entirety, assigned to the assignee of the present application.

BACKGROUND OF THE INVENTION

The present disclosure relates generally to system migration, and in particular to migrating contents of a memory on a virtual machine.

System migrations of virtual machines are performed for a variety of reasons, including the ability to provide a back-up system while hardware and/or software upgrades are being installed. The virtual machine (including memory, system, applications, etc.) that is being copied is typically referred to as the source virtual machine and the virtual machine that is built as a result of the migration is referred to as the target virtual machine. One method of ensuring that the target virtual machine correctly reflects the contents of the source virtual machine is to halt execution of the source virtual machine to perform the migration. A snapshot is taken of the source virtual machine. The snapshot is utilized to create the target virtual machine and the target virtual machine is started. One problem with this approach is the system outage that occurs between the time that the source virtual machine is halted and the target virtual machine is started. Given that modern memories often include gigabytes and even terabytes of data, the system outage required to migrate the memory may be excessive.

Another approach to performing system migrations of virtual machines is to perform the migration while the source virtual machine is executing. This avoids the lengthy outage time to transfer the memory contents from the source memory to the target machine. However, this introduces a new problem of how to propagate updates (into memory on the target virtual machine) that occur to the memory on the source virtual machine while the migration is in process.

It would be desirable to be able to perform data migration in a manner that provides virtually uninterrupted service to the system users. This would require the ability to efficiently incorporate updates (into memory on the target machine) that occur to the memory on the source virtual machine while the migration is in process. Further, it would be desirable to be able transmit the data in an order that would likely result in fewer updates to the data after it has been migrated to the target virtual machine.

BRIEF SUMMARY OF THE INVENTION

Embodiments of the present invention include a method for migrating contents of a memory on a virtual machine. The method includes computer instructions for facilitating establishing communication from a source virtual machine to a target virtual machine, the source virtual machine including a memory. The contents of the memory on the source virtual machine are transmitted to the target virtual machine. The contents of the memory on the source virtual machine include a plurality of pages. It is determined if all or a subset of the pages have been modified on the source virtual machine sub- Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide methods, systems and computer program products for migrating memory contents from a source virtual machine to a target virtual machine while providing minimal workload disruption.

An exemplary embodiment includes migrating contents of a memory on a source virtual machine in an iterative manner in order to identify and resend only those memory pages that have been updated subsequent to being migrated to the target virtual machine. An exemplary embodiment includes a packed data structure containing only the necessary information for transmitting updated pages in the source memory and for placing them in their corresponding location on the target virtual machine.

Another exemplary embodiment includes tracking data updates during memory migration in order to identify those memory pages on the source virtual machine that have been updated subsequent to being migrated to the target virtual machine. An exemplary embodiment includes a data structure that provides for efficient locating of the pages that have been updated. This is described herein and in U.S. patent application Ser. No. 11/845,344, entitled "TRACKING DATA UPDATES DURING MEMORY MIGRATION", of common assignment herewith, and herein incorporated by reference in its entirety.

An additional embodiment includes utilizing system configuration information to determine an efficient data migration order (e.g., one that will migrate pages that are likely to be updated less frequently before pages that are likely to be updated more frequently). An exemplary embodiment migrates source virtual machine operating systems using optimizations based on the source virtual machine being migrated. When beginning a virtual machine migration sequence, the migration manager (i.e., the migration control program) is hinted to use migration profiles optimized for the virtual operating system instance being migrated. This is described herein and in U.S. patent application Ser. No. 11/845,389, entitled "UTILIZING SYSTEM CONFIGURATION INFORMATION TO DETERMINE A DATA MIGRATION ORDER", of common assignment herewith, and herein incorporated by reference in its entirety.

A further embodiment includes utilizing actual data access patterns to determine an efficient data migration order. This is described herein and in U.S. patent application Ser. No. 11/845,389, entitled "UTILIZING DATA ACCESS PATTERNS TO DETERMINE A DATA MIGRATION ORDER", of common assignment herewith, and herein incorporated by reference in its entirety. This is also described in U.S. patent application Ser. No. 11/845,389, entitled "METHOD FOR UTILIZING DATA ACCESS PATTERNS TO DETERMINE A DATA MIGRATION ORDER", of common assignment herewith, and herein incorporated by reference in its entirety.

Figure 1:
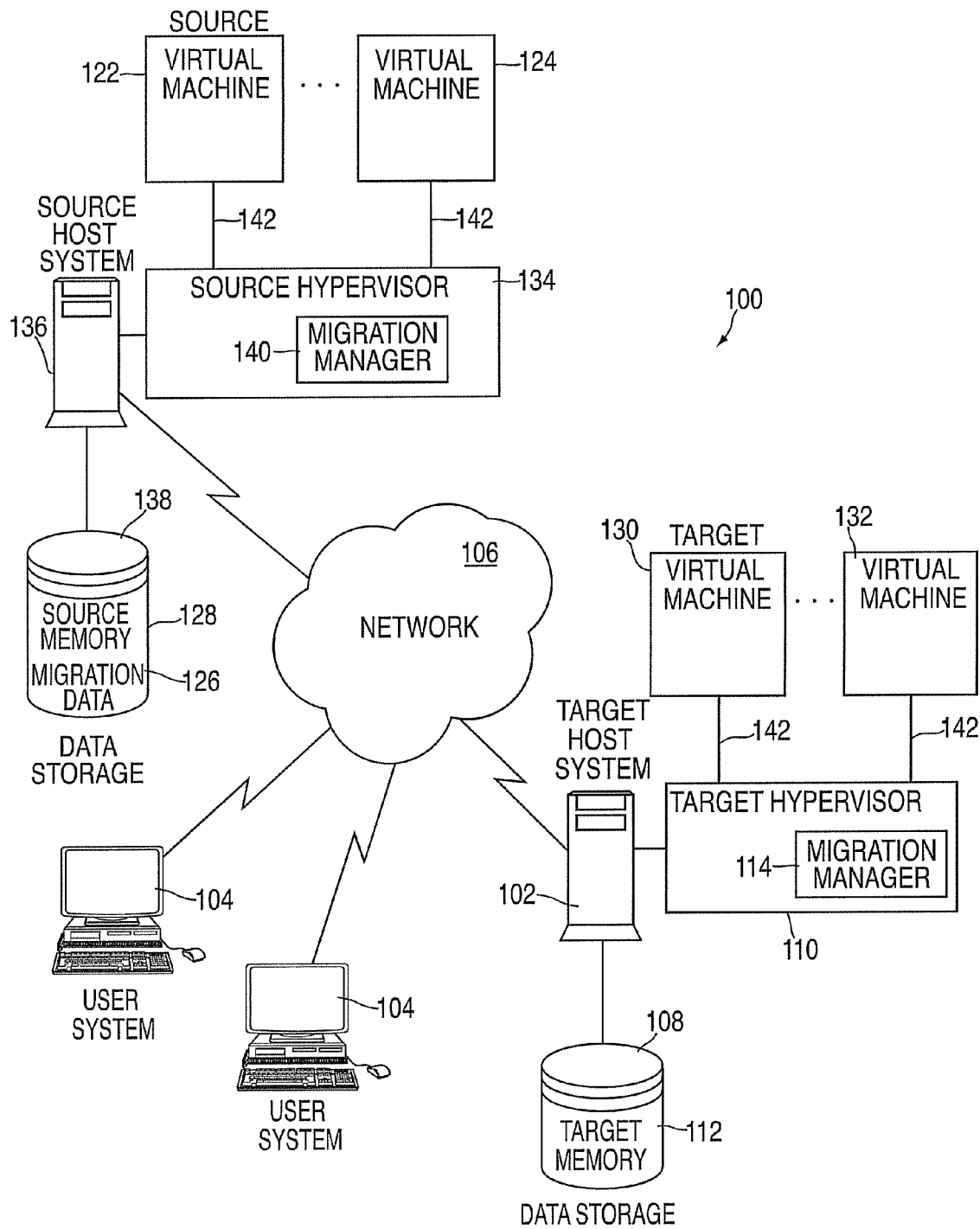
FIG. 1 is a block diagram of a system that may be implemented by an exemplary embodiment of the present invention.

The system 100 of FIG. 1 includes a source host system 136 in communication with user systems 104 and a target host system 102 over a network 106. In exemplary embodiments, the source host system 136 is a high-speed processing device (e.g., a mainframe computer) including at least one processing circuit (e.g., a CPU) capable of reading and executing instructions, and handling numerous interaction requests from the user systems 104 as a shared physical resource. The source host system 136 may function as a development and system-testing platform for developing, integrating, and testing various hardware and/or software combinations. The source host system 136 can also run other applications, and may serve as a Web server, applications server, and/or a database server. In exemplary embodiments, the user systems 104 comprise desktop, laptop, or general-purpose computer devices that provide an interface for communicating with the source host system 136. Users can initiate various tasks on the source host system 136 via the user systems 104, such as developing and executing system tests, running application programs, and initiating a system migration. While only a single source host system 136 is shown in FIG. 1, it will be understood that multiple host systems can be implemented, each in communication with one another via direct coupling or via one or more networks. For example, multiple host systems may be interconnected through a distributed network architecture. The single source host system 136 may also represent a cluster of hosts collectively performing processes as described in greater detail herein.

The network 106 may be any type of communications network known in the art. For example, the network 106 may be an intranet, extranet, or an internetwork, such as the Internet, or a combination thereof. The network 106 can include wireless, wired, and/or fiber optic links.

In exemplary embodiments, the source host system 136 accesses and stores data in a source data storage device 138. The source data storage device 138 refers to any type of storage and may comprise a secondary storage element, e.g., hard disk drive, tape, or a storage subsystem that is internal or external to the source host system 136. Types of data that may be stored in the source data storage device 138 include, for example source memory 128 included in the source virtual machine 122 and migration data (e.g., data structures). In an exemplary embodiment, contents of the source memory 128 include memory pages. In an exemplary embodiment, source virtual machine configuration information and/or source memory access data is also stored in the data storage device 138. It will be understood that the source data storage device 138 shown in FIG. 1 is provided for purposes of simplification and ease of explanation and is not to be construed as limiting in scope. To the contrary, there may be multiple source data storage devices 138 utilized by the source host system 136.

In exemplary embodiments, the source host system 136 executes various applications, including a source hypervisor 134 and multiple virtual machines (source virtual machine 122, virtual machine 124, etc.). The term "hypervisor" refers to a low-level application that supports the execution of one or more virtual machines. The source hypervisor 134 manages access to resources of the source host system 136 and serves as a virtual machine monitor to support concurrent execution of the virtual machines. Each virtual machine can support specific guest operating systems and multiple user sessions for executing software written to target the guest operating systems. For example, one virtual machine may support an instance of the Linux® operating system, while a second virtual machine executes an instance of the z/OS® operating system. Other guest operating systems known in the art can also be supported by the source hypervisor 134 through the virtual machines.

In exemplary embodiments, the source hypervisor 134 executes a migration manager 140 to perform the processing described herein to migrate source memory 128 from the source virtual machine 122 to target memory 112 on a target virtual machine 130.

In exemplary embodiments, the source hypervisor 134 manages execution control of virtual machines on the source host system 136 through a virtual machine control bus 142. Each virtual machine control bus 142 may handle an exchange of low-level control information, such as interrupts, device driver commands, device driver data, and the like.

FIG. 1 also includes a target host system 102 in communication with user systems 104 and the source host system 136 over the network 106. In exemplary embodiments, the target host system 102 is a high-speed processing device (e.g., a mainframe computer) including at least one processing circuit (e.g., a CPU) capable of reading and executing instructions, and handling numerous interaction requests from the user systems 104 as a shared physical resource. The target host system 102 may function as a development and system-testing platform for developing, integrating, and testing various hardware and/or software combinations. The target host system 102 can also run other applications, and may serve as a Web server, applications server, and/or a database server. In exemplary embodiments, the user systems 104 comprise desktop, laptop, or general-purpose computer devices that provide an interface for communicating with the target host system 102. Users can initiate various tasks on the target host system 102 via the user systems 104, such as developing and executing system tests, running application programs, and initiating a system migration. While only a single target host system 102 is shown in FIG. 1, it will be understood that multiple host systems can be implemented, each in communication with one another via direct coupling or via one or more networks. For example, multiple host systems may be interconnected through a distributed network architecture. The single source target host system 102 may also represent a cluster of hosts collectively performing processes as described in greater detail herein.

In exemplary embodiments, the target host system 102 accesses and stores data in a target data storage device 108. The target data storage device 108 refers to any type of storage and may comprise a secondary storage element, e.g., hard disk drive, tape, or a storage subsystem that is internal or external to the target host system 102. Types of data that may be stored in the target data storage device 108 include, for example target memory 112 included in the target virtual machine 130. It will be understood that the target data storage device 108 shown in FIG. 1 is provided for purposes of simplification and ease of explanation and is not to be construed as limiting in scope. To the contrary, there may be multiple target data storage devices 108 utilized by the target host system 136.

In exemplary embodiments, the target host system 102 executes various applications, including a target hypervisor 110 and multiple virtual machines (target virtual machine 130, virtual machine 132, etc.). The target hypervisor 110 manages access to resources of the target host system 102 and serves as a virtual machine monitor to support concurrent execution of the virtual machines. Each virtual machine can support specific guest operating systems and multiple user sessions for executing software written to target the guest operating systems. For example, one virtual machine may support an instance of the Linux® operating system, while a second virtual machine executes an instance of the z/OS® operating system. Other guest operating systems known in the art can also be supported by the target hypervisor 110 through the virtual machines.

In exemplary embodiments, the target hypervisor 110 executes a migration manager 114 to perform the processing described herein to receive source memory 128 from the source virtual machine 122 into the target memory 112 on the target virtual machine 130.

In exemplary embodiments, the target hypervisor 110 manages execution control of virtual machines on the target host system 102 through a virtual machine control bus 142. Each virtual machine control bus 142 may handle an exchange of low-level control information, such as interrupts, device driver commands, device driver data, and the like.

Figure 2:
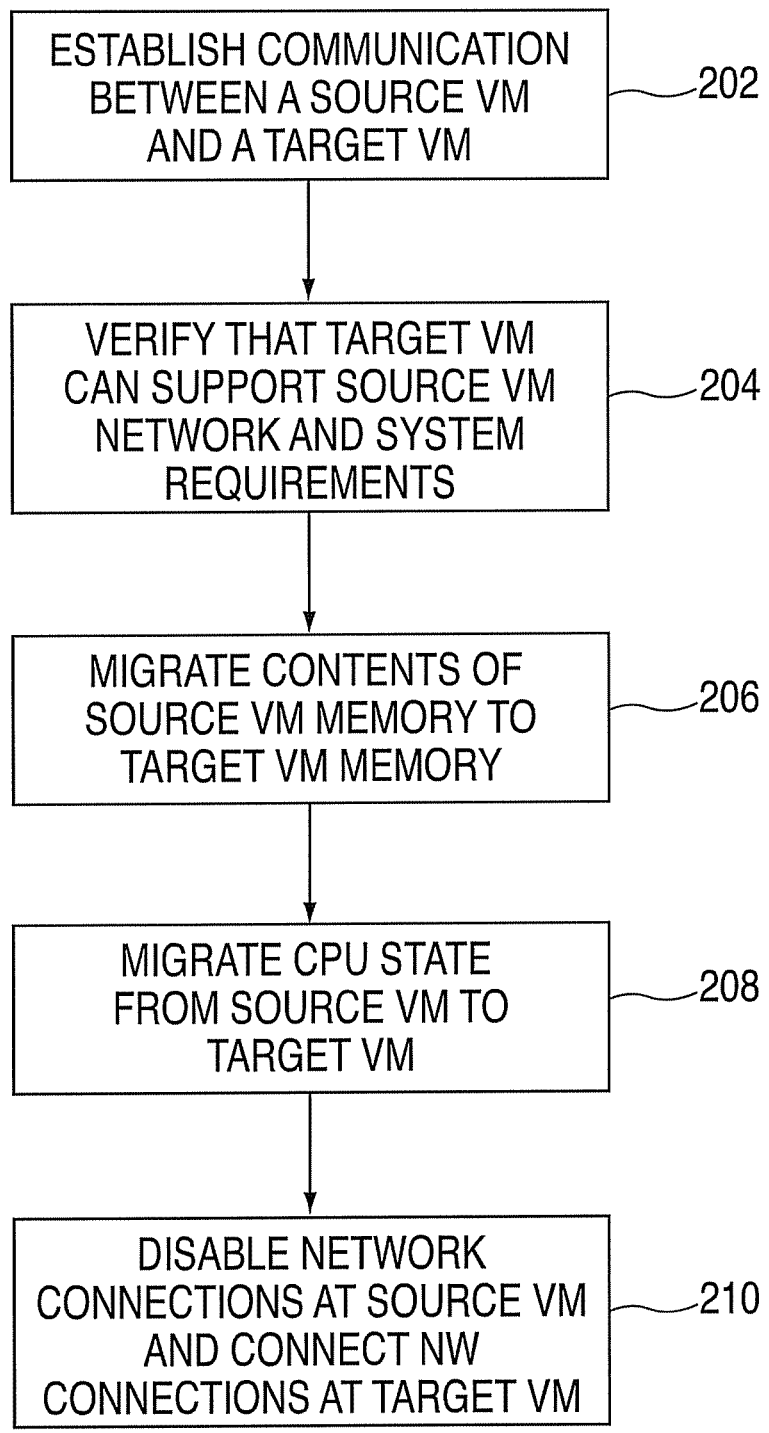
FIG. 2 depicts a process for migrating from a source virtual machine to a target virtual machine in accordance with exemplary embodiments.

Turning now to FIG. 2, a process for migrating from a source virtual machine 122 to a target virtual machine 124 will now be described in accordance with exemplary embodiments, and in reference to the system 100 of FIG. 1. At block 202, communication is established between the migration manager 140 being executed in the source hypervisor 134 and the migration manager 114 being executed by the target hypervisor 110. In an exemplary embodiment, this communication is implemented by a peer-to-peer (P2P) session via the network 106. In this manner, the source virtual machine 122 is in communication with the target virtual machine 130. At block 204, the migration manager 140 being executed by the source hypervisor 134 verifies that the target virtual machine 130 can support the network and system requirements of the virtual machine 122. The verification may include verifying that the target virtual machine 130 can support a network connection to a particular host system, user system, and/or data storage device that the source virtual machine 122 utilizes.

At block 206, the contents of the source virtual machine memory 128 are transmitted to the target virtual machine memory 112. FIGS. 3-6 below describe exemplary processes that may be implemented by the migration manager 140 on the source hypervisor 134 to perform the data migration from the source virtual machine memory 128 to the target virtual machine 130. The migration manager 114 executing on the target hypervisor 110 allocates memory resources for the data being migrated to the target virtual machine 130. In an exemplary embodiment, the data migration is performed while providing virtually uninterrupted service to the system users. At block 208, the central processing unit (CPU) state (e.g., registers, hardware bits, etc.) of the source virtual machine 122 is transmitted to the target virtual machine 130. The migration manager 114 executing on the target hypervisor 110 allocates machine state resources to support the CPU state at the target virtual machine 130. At block 210, the target virtual machine 130 is started by the migration manager 114 executing on the target hypervisor 110 and the source virtual machine 122 is deleted by the migration manager 140 executing on the source hypervisor 134.

Figure 3:
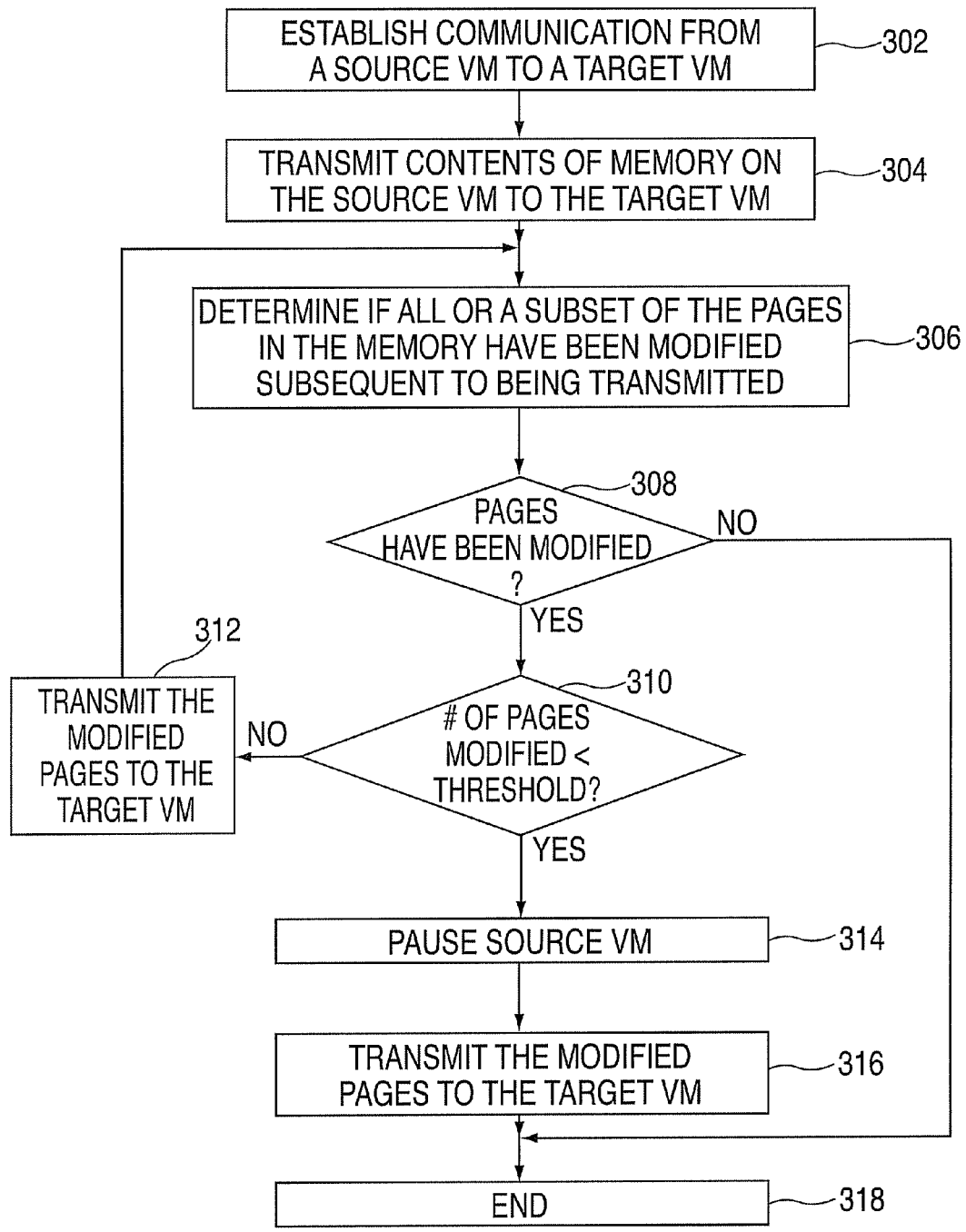
FIG. 3 depicts a process for migrating contents of a memory on a virtual machine in accordance with exemplary embodiments.

FIG. 3 depicts a process for migrating contents of a memory on a virtual machine that may be implemented in accordance with exemplary embodiments. In an exemplary embodiment, the processing is performed by the migration manager 140 executing on the source hypervisor 134. The process depicted in FIG. 3 may be utilized to migrate contents of the source memory 128 to the target memory 112 in an iterative manner in order to identify and resend only those memory pages that have been updated subsequent to being migrated to the target virtual machine 130. At block 302, communication is established from the source virtual machine 122 to the target virtual machine 130. In an exemplary embodiment, this communication is via the migration manager 140 executing on the source hypervisor 134 and the migration manager 114 executing on the target hypervisor 110. At block 304, the contents of the source memory 128 are transmitted to the target virtual machine 130.

Figure 4:
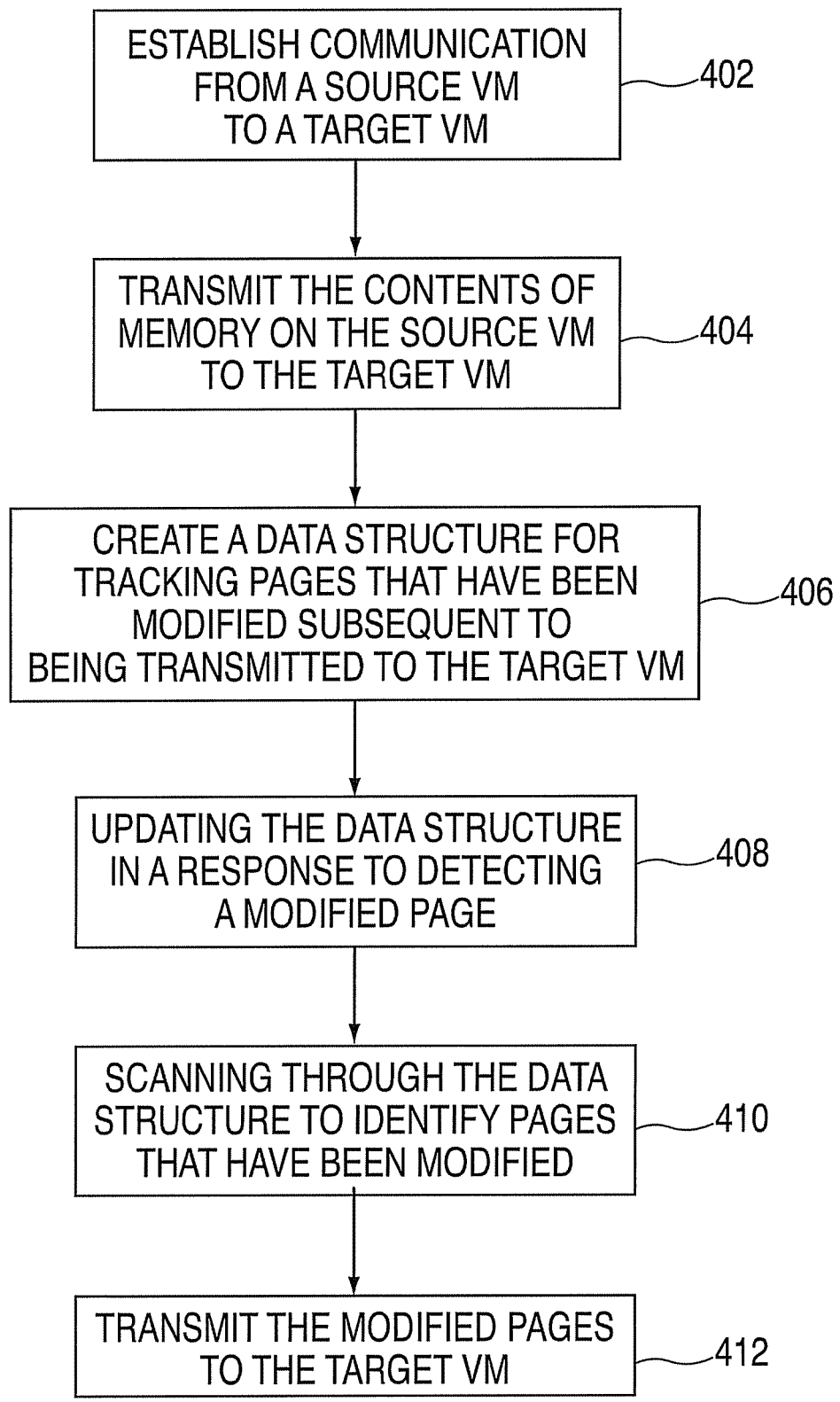
FIG. 4 depicts a process for tracking data updates during memory migration in accordance with exemplary embodiments.

Next, at block 306, it is determined if all or a subset of the pages in the source memory 128 have been modified subsequent to being transmitted to the target virtual machine 130. If pages have been modified then the target virtual machine has an outdated version of the source memory 128. FIG. 4 below depicts an exemplary process that may be utilized to determine if the pages have been modified. If the target virtual machine 130 has an outdated version of the data, as determined at block 308, then block 310 is performed to determine if the number of pages that have been modified is less than a threshold. The threshold is user programmable (e.g., via an operator located at a user system 104) and is chosen based on a variety of implementation specific characteristics such as network bandwidth and processing speed of the source host system 136. If the number of pages modified is not less than the threshold, then block 312 is performed and the modified pages in the source memory 128 are transmitted to the target virtual machine 130. Processing then continues at block 306. If the number of pages modified is less than the threshold, then processing continues at block 314 where the source virtual machine 122 is paused. Next, at block 316, the modified pages are transmitted to the target virtual machine 130 and execution of the source virtual machine 122 is resumed. The process is completed at block 318. If it is determined at block 308, that no pages have been modified, the processing is completed at block 318.

In an exemplary embodiment, the modified pages are transmitted in a data structure that includes packed pairs, each pair including content of a given page and an integer page offset based from zero which represents the first page in the source memory 128. In an exemplary embodiment, the data structure is stored on the source data storage device 138 as migration data 126. An example format includes: [OFFSET 1][PAGE 1][OFFSET 2][PAGE 2] . . . [OFFSET N][PAGE N], where each offset is no larger than the size of the largest number of pages for the source memory 128, and the pages are the entire virtual memory verbatim. An invalid page offset may be utilized as a sentinel specifying that no more iterations are to follow and that finalization may occur. Iteratively constructing these data structures from only the pages that have changed since the last iteration (optimally such that N pairings of page and offset can be transmitted without network degradation) and transmitting them, yields an iterative memory migration strategy sufficient to yield imperceptible page migration. The receiving party, the target virtual machine 130, scans the buffer, jumping to each offset and writing out the adjacent page. Additionally, invalid offsets can be used to indicate the end of readable data in the remainder of the buffer, or used to indicate that no jump is necessary as the next page is sequentially aligned.

FIG. 4 depicts a process for tracking data updates during memory migration in accordance with exemplary embodiments. In an exemplary embodiment, the processing is performed by the migration manager 140 executing on the source hypervisor 134. The exemplary process depicted in FIG. 4 populates a data structure with a bit field of length "n", where n is the number of pages of virtual memory that the source virtual machine 122 has. Additionally, the data structure contains an integer index for the first set bit in the field, as well as the last set bit in the field and the total number of bits set in the field. Bits set to the non-initialized state correspond to pages of interest (e.g., pages that have been modified subsequent to being transferred to the target virtual machine 130). In an exemplary embodiment, the data structure is stored on the source data storage device 138 as migration data 126. In exemplary embodiments, the data structure is extended by the addition of indices into the basic structure. For example, the data structure includes an index into a bit field of length logk(n), where k represents a set of k contiguous bits in the full bit field.

Referring to FIG. 4, at block 402, communication is established from the source virtual machine 122 to the target virtual machine 130. In an exemplary embodiment, this communication is via the migration manager 140 executing on the source hypervisor 134 and the migration manager 114 executing on the target hypervisor 110. At block 404, the contents of the source memory 128 are transmitted to the target virtual machine 130. At block 406, a data structure (such as the bit field described previously) is created to track pages that are modified subsequent to being transmitted to the target virtual machine 130. At block 408, the data structure is updated in response to detecting that a page has been modified.

In an exemplary embodiment, blocks 406 and 408 are performed by two processes in the migration manager 140 on the target hypervisor that are executed concurrently by the migration manager 140. A first process tracks any updates to the pages in the source memory 128. The original bit field, having at least one bit for each page in the source memory 128, is initialized to all "1's" when it is created. The first process also initializes any indices (e.g., to the first set bit, and the last set bit) and counters (e.g., the total number of set bits). When a request to track modified pages is received, the original bit field data structure is sent to the requestor. Next, the bit field data structure is reset to all "0's". When page modifications are detected by the source hypervisor 134, the bit in the bit field corresponding to the modified page is set to "1".

A second process is executed by the source hypervisor 134 concurrently with the first process to track pages that have been transmitted to the target virtual machine 130. The second process requests the original bit field and resets bits to "0" when it detects that the corresponding pages have been transmitted. The second process also updates any indices and counters. The second process then requests an updated bit field that indicates pages that have been modified since the last request for an updated bit field. The second process then compares the bits in the original bit field to the update bit field. If a bit in the updated bit field contains a "1" in a bit location where the original bit field contains a "0", then the bit in the original bit field is set to "1". This indicates that the corresponding page in the source memory 128 has already been transmitted to the target virtual machine 130 and that the corresponding page has been modified subsequent to this the transmission. Thus, the corresponding page will need to be transmitted again to the target virtual machine. This process of detecting pages that have been transmitted and updating the original bit field continues until the process is ended by the migration manager 140.

At block 410, the data structure (e.g., the original bit field as updated by the second process) is scanned to identify pages in the source memory 128 that have been modified subsequent to being transmitted to the target virtual machine 130. Any bit location with a "1" indicates that the corresponding page has been updated. The scanning may utilize any indices and counters for more efficient locating of the pages that have been modified. In an exemplary embodiment, the scanning begins at the first set bit index and ends at the last set bit index. At block 412, the modified pages are transmitted to the target virtual machine 130. The modified pages may be transmitted in the format described previously with respect to FIG. 3 (e.g., [OFFSET 1][PAGE 1] . . . [OFFSET N][PAGE N]). As described previously, the process depicted in FIG. 4 could be performed as part of the process depicted in FIG. 3 to perform block 306 to determine if all or a subset of the pages have been modified subsequent to being transmitted. In this case, the original bit field would only be reset once during the initial loop through the process in FIG. 4.

Figure 5:
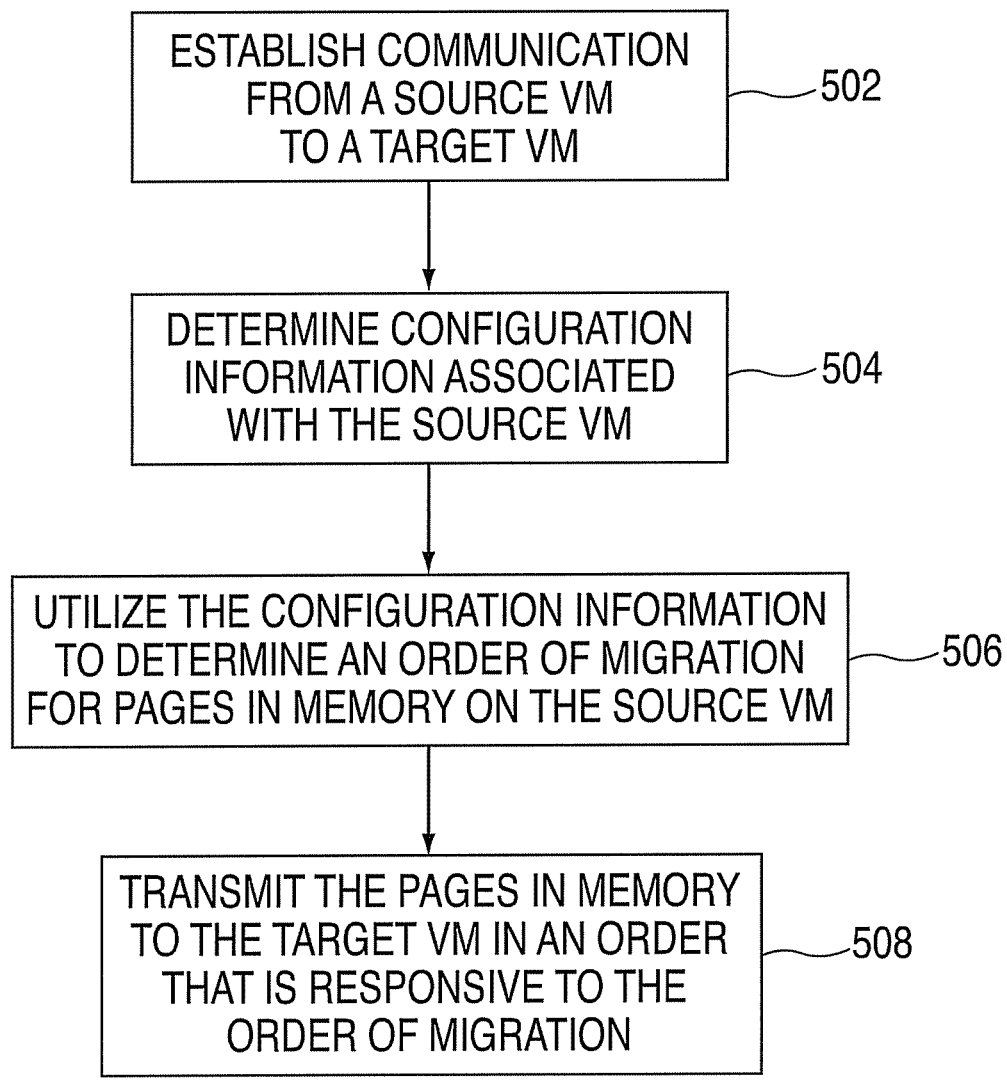
FIG. 5 depicts a process for utilizing system configuration information to determine a data migration order in accordance with exemplary embodiments.

FIG. 5 depicts a process for utilizing system configuration information to determine a data migration order in accordance with exemplary embodiments. In an exemplary embodiment, the processing is performed by the migration manager 140 executing on the source hypervisor 134. The process depicted in FIG. 5 migrates the source virtual machine 122 using optimizations based on the operating system being utilized on the source virtual machine 122. When beginning a virtual machine migration sequence, the migration manager 140 is hinted to use migration profiles optimized for the operating system on the virtual machine instance being migrated. The hint (also referred to herein as configuration information) can take the form of an enumeration (or some other mapping) of known operating systems to their optimized migration routines. The enumeration representing the operating system being migrated may be provided by an operator via a user system 104 or determined automatically by the migration manager 140 executing on the source hypervisor 134. Using this configuration information, the migration manager 140 can optimally migrate the source virtual machine 122 based on the nature of the particular source virtual machine 122. Most typically, this is influenced by the operating system being executed on the source virtual machine 122. An implementation that automatically infers the operating system operating on the source virtual machine 122 without user intervention is performed by the source hypervisor 134 executing an introspection into the source virtual machine address space.

Referring to FIG. 5, at block 502, communication is established from the source virtual machine 122 to the target virtual machine 130. In an exemplary embodiment, this communication is via the migration manager 140 executing on the source hypervisor 134 and the migration manager 114 executing on the target hypervisor 110. At block 504, the configuration information associated with the source virtual machine 122 is determined. As described previously, the configuration information may be determined based on one or both of information entered by an operator and information determined automatically by the source hypervisor 134. At block 506, the configuration information is utilized to determine an order of migration for pages in the source memory 128. In this manner, the order of migration may suggest that pages in the source memory 128 that are likely to be accessed frequently should be migrated after pages that are likely to be accessed less frequently. For example, the configuration information may specify that the operating system is Linux® and direct the migration manager 140 to a table that specifies memory characteristic and/or other characteristics having an impact on migration, associated with Linux®. This may include information such as where the kernel is typically located in a Linux® machine. The configuration information may relate to the network 106 and provide information about maximizing throughput on the network, which may have an impact on the suggested order of migration. The configuration information may also relate to specifics about how the source virtual machine 122 is configured. In an alternate exemplary embodiment, all or a portion of the configuration information may be entered by a system operator. At block 508, pages in the source memory 128 are transmitted to the target virtual machine 130 based on the information contained in the order of migration. The processing depicted in FIG. 5 may be utilized by any of the previous processes (e.g., blocks 304, 312 of FIG. 3, and blocks 404, 412 of FIG. 4) when transmitting pages from the source memory 128 to the target virtual machine 130.

Figure 6:
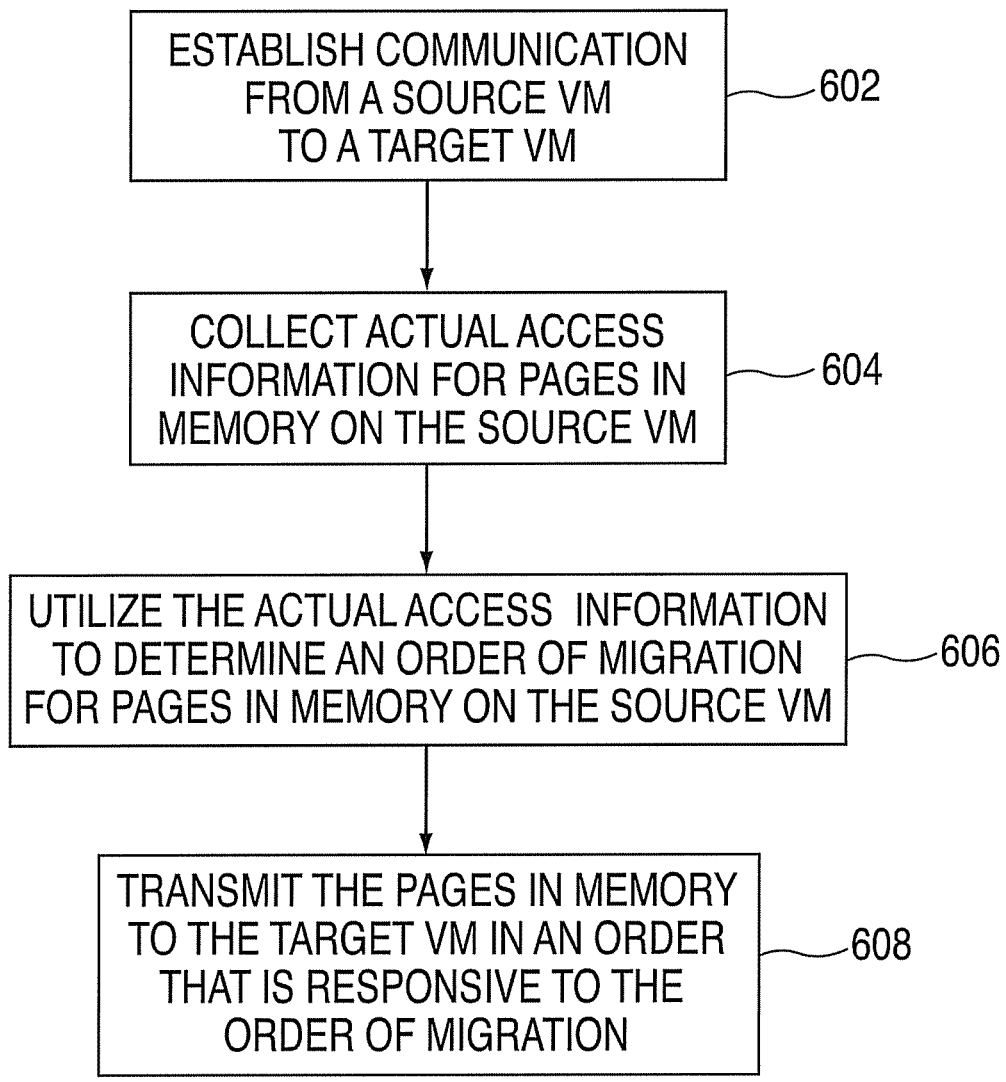
FIG. 6 depicts a process for utilizing data access patterns to determine a data migration order in accordance with exemplary embodiments.

FIG. 6 depicts a process for utilizing actual data access patterns to determine a data migration order in accordance with exemplary embodiments. In an exemplary embodiment, the processing is performed by the migration manager 140 executing on the source hypervisor 134. The process depicted in FIG. 6 does not adhere to a universal model of memory usage, or a known model that is typical of a particular operating system; instead it constructs a dynamic model of memory access in real time form the actual usage of the source memory 128. In an exemplary embodiment, the source hypervisor 134 tracks page changes and records regions of the source memory 128 which are known to have high rates of modification. This access information is typically already being collected by the source hypervisor 134 as part of providing memory accesses on the source virtual machine 122. This actual access information is utilized to build a memory usage profile for later use by the migration manager 140 in determining an order of migration for pages in the memory. The actual access information may also be utilized along with the configuration information described previously to determine the order of migration.

Referring to FIG. 6, at block 602, communication is established from the source virtual machine 122 to the target virtual machine 130. In an exemplary embodiment, this communication is via the migration manager 140 executing on the source hypervisor 134 and the migration manager 114 executing on the target hypervisor 110. At block 604, the actual access information for pages in the source memory 128 is collected by the migration manager 140. At block 606, the actual access information is utilized to determine an order of migration for pages in the source memory 128. In this manner, the order of migration may suggest that pages in the source memory 128 that have been accessed frequently in the past should be migrated after pages that have been accessed less frequently in the past. At block 608, pages in the source memory 128 are transmitted to the target virtual machine 130 based on the information contained in the order of migration. The processing depicted in FIG. 6 may be utilized by any of the previous processes (e.g., blocks 304, 312 of FIG. 3, and blocks 404, 412 of FIG. 4) when transmitting pages from the source memory 128 to the target virtual machine 130.

Technical effects of exemplary embodiments include the ability to perform data migration is performed while providing virtually uninterrupted service to the system users. Technical effects also include the ability to efficiently incorporate updates (into memory on the target machine) that occur to the memory on the source virtual machine while the migration is in process. Technical effect further include the ability to transmit the data in an order that will likely result in fewer updates to the data after it has been migrated to the target virtual machine.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for migrating contents of a memory on a virtual machine, the method comprising instructions for facilitating:
   transmitting contents of the memory on the source virtual machine to a target virtual machine according to a data migration order, the data migration order determined based on system configuration information, the system configuration information comprising an operating system executing on the source virtual machine and migration profiles comprising mappings of known operating systems to migration routines optimized for the known operating systems, the migration routines, including memory characteristics specific to the known operating systems that have an impact on migration order;
   determining that one or more pages have been modified on the source virtual machine subsequent to being transmitted to the target virtual machine; and
   based on determining that one or more of the pages have been modified:
   transmitting the modified pages including a page offset and page content for each of the modified pages to the target virtual machine, the modified pages transmitted in a data structure comprising packed pairs of the page offset and the page content for each of the modified pages;
   continuing the determining and transmitting the modified pages until the number of remaining pages that have been modified is less than a threshold;
   pausing the source virtual machine;
   based on the pausing, transmitting the remaining modified pages to the target virtual machine; and
   transmitting an invalid page offset indicating one of an end of readable data in a buffer, and that no jump is necessary as a next page is sequentially aligned.

2. The method of claim 1 wherein the source virtual machine is located on a host system and the method is executed by a hypervisor on the host system, the hypervisor in communication with the source virtual machine.

3. The method of claim 1 further comprising resuming execution of the source virtual machine.

4. The method of claim 1 wherein the threshold is programmable.

5. The method of claim 1 wherein the target virtual machine receives the contents and the modified pages via a hypervisor that is in communication with the target virtual machine.

6. The method of claim 1 wherein the transmitting is via a network.

7. The method of claim 1 wherein a communication from the source virtual machine and the target virtual machine is established between a source hypervisor in communication with the source virtual machine and a target hypervisor in communication with the target virtual machine.

8. The method of claim 1 further comprising transmitting the invalid page offset as a sentinel specifying that no more iterations are to follow and that finalization is to occur.

9. The method of claim 1 wherein the page offset comprises an integer page offset based from zero that represents a first page in a source memory.

10. A method for migrating contents of a memory on a virtual machine, the method comprising instructions for facilitating:
    transmitting contents of the memory on the source virtual machine to a target virtual machine according to a data migration order, the data migration order determined based on system configuration information, the system configuration information comprising an operating system executing on the source virtual machine and migration profiles comprising mappings of known operation systems to migration routines optimized for the known operating systems, the migration routines including memory characteristics specific to the known operating systems that have an impact on migration order;
    determining that one or more pages have been modified on the source virtual machine subsequent to being transmitted to the target virtual machine; and
    based on determining that one or more of the pages have been modified:
    transmitting the modified pages including a page offset and page content for each of the modified pages to the target virtual machine, the modified pages transmitted in a data structure comprising packed pairs of the page offset and the page content for each of the modified pages;
    continuing the determining and transmitting the modified pages until the number of remaining pages that have been modified is less than a threshold;
    pausing the source virtual machine;
    based on the pausing, transmitting the remaining modified pages to the target virtual machine; and
    transmitting an invalid page offset as a sentinel specifying that no more iterations are to follow and that finalization is to occur.

11. The method of claim 10 wherein the page offset comprises an integer page offset based from zero that represents a first page in a source memory.

12. A method for migrating contents of a memory on a virtual machine, the method comprising instructions for facilitating:
    transmitting contents of the memory on the source virtual machine to a target virtual machine according to a data migration order, the data migration order determined based on system configuration information, the system configuration information comprising an operating system executing on the source virtual machine and migration profiles comprising mappings of known operating systems to migration routines optimized for the known operating systems, the migration routines including memory characteristics specific to the known operating systems that have an impact on migration order;
    determining that one or more pages have been modified on the source virtual machine subsequent to being transmitted to the target virtual machine; and
    based on determining that one or more of the pages have been modified:
    transmitting the modified pages to the target virtual machine in a data structure that includes packed pairs, each packed pair including a page offset and page content, the page offset comprising an integer page offset based from zero that represents a first page in a source memory;
    continuing the determining and transmitting the modified pages until the number of remaining pages that have been modified is less than a threshold;
    pausing the source virtual machine; and
    based on the pausing, transmitting the remaining modified pages to the target virtual machine.

13. The method of claim 12 further comprising transmitting an invalid page offset as one of: a sentinel specifying that no more iterations are to follow and that finalization is to occur; an indication of an end of readable data in a buffer; and an indication that no jump is necessary as a next page is sequentially aligned.

* * * * *